Patented Oct. 27, 1931

1,829,618

UNITED STATES PATENT OFFICE

CLAIR W. STUDER, OF NORTH CANTON, OHIO, ASSIGNOR TO THE HOOVER COMPANY, A CORPORATION OF OHIO

FILTER MATERIAL AND PROCESS OF MAKING IT

No Drawing.   Application filed August 2, 1929.   Serial No. 383,179.

This application relates to filtering material for separating dust and other solid particles from air or other gases, and the process of making such a material. It particularly relates to a material for dust separating bags for use with suction cleaners, and has for an object the provision of a suitable material for such use, which will not only effectively collect all of the dust particles but will also be durable under the abrasion and bending encountered in use.

Further objects are to provide such a material which can be economically manufactured, which will not be materially affected by changes in temperature and moisture, and which will be substantially fire proof. Still further objects of the invention will be apparent from the following specification.

For use in constructing a filtering bag the material is preferably in the form of a sheet, and is composed of paper formed from pure manila hemp fiber, the paper having a thickness of approximately eight thousandths of an inch and being comparatively porous. It will be understood that the thickness and the compactness, as determined by the calendering and other features of the manufacture, may be varied to suit the particular filtering capacity and back pressure limits which must be considered in meeting the requirements of a machine of any particular design.

The paper, preferably in sheet form, is strengthened by the application of a synthetic resin such as a vinyl resin, with which the paper may be readily impregnated by applying a solution of the synthetic resin in ethylene dichloride, or other suitable solvent, which will penetrate into the fibers and, upon evaporation, leave the resin impregnated in the paper and coating the fibers. While many suitable synthetic resins, particularly many vinyl resins and mixtures of vinyl resins, are known, the resin preferably used is that obtained by the polymerization of vinyl acetate, the reaction being continued until the resin is formed as a solid. The solid resin is then dissolved preferably in ethylene dichloride, a suitable plasticizer, preferably dibutyl phthalate, being added, in order that the finished paper will not be stiff or brittle, but will have the requisite tensile strength and toughness to endure the abrasion and repeated bending which will be encountered in use.

Other solvents, such as that composed of a mixture of two-thirds carbon tetrachloride and one-third amyl acetate, may be used, and various compounds may be used as a plasticizer, such as iso amyl phthalate or tri cresyl phosphate, it being understood that the term "plasticizer" is used to indicate any suitable compound which is miscible with the ethylene dichloride, or other solvent, and will prevent the resin from hardening to such an extent as to render the fibrous mass brittle or stiff.

In practice, the solution is preferably applied to the paper in sheet form, and the bags are cut from the sheet and formed after the material is dry. However, the bags may be first formed, and the resin solution applied to the finished bag. Similarly, it will be understood that the fibrous filtering mass may be shaped into any desired form and, after it is dry, may be treated as described to increase its efficiency and prolong its life.

The invention having been thus described, what is claimed is:—

1. An air-porous dust-separating bag for use with a suction cleaner, comprising a sheet formed of cellulose fibers coated with a resin in an amount insufficient to lessen materially the permeability of the sheet.

2. An air-porous dust-separating bag for use with a suction cleaner, comprising a sheet formed of cellulose fibers treated with a resin in an amount insufficient to lessen materially the permeability of the sheet, and with a plasticizer in an amount sufficient to render such fibers permanently plastic.

Signed at North Canton, in the county of Stark, and State of Ohio, this 26th day of July, A. D. 1929.

CLAIR W. STUDER.